Patented Feb. 23, 1932

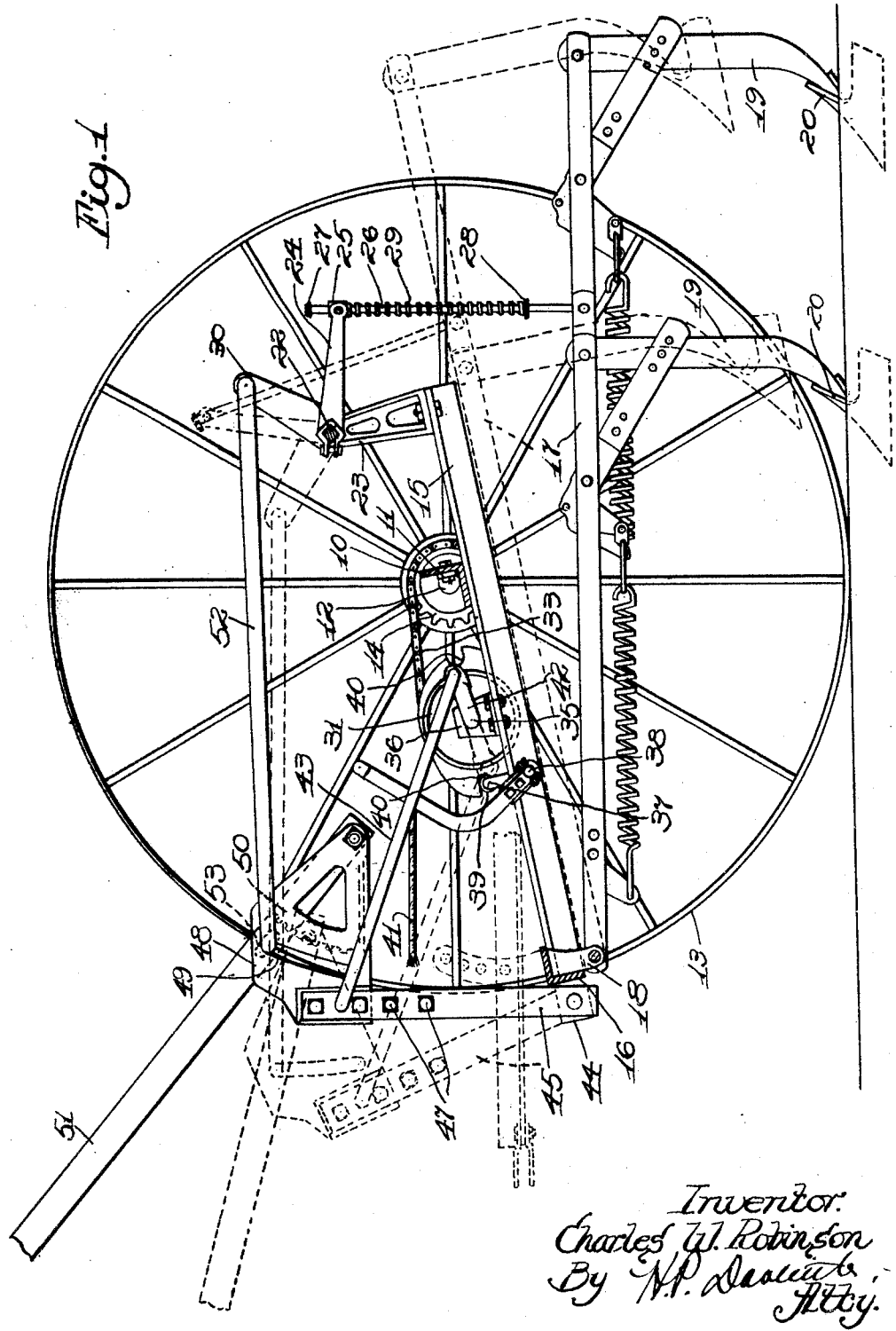

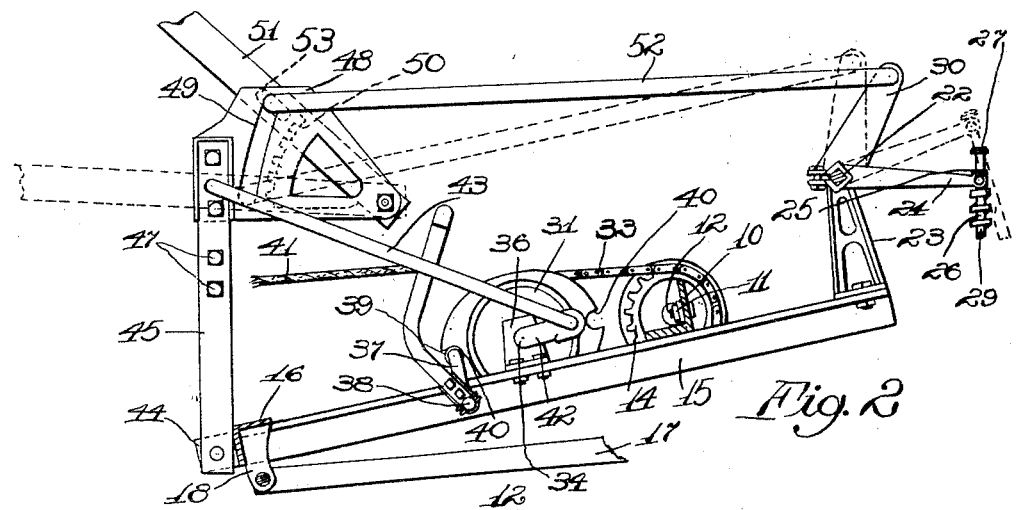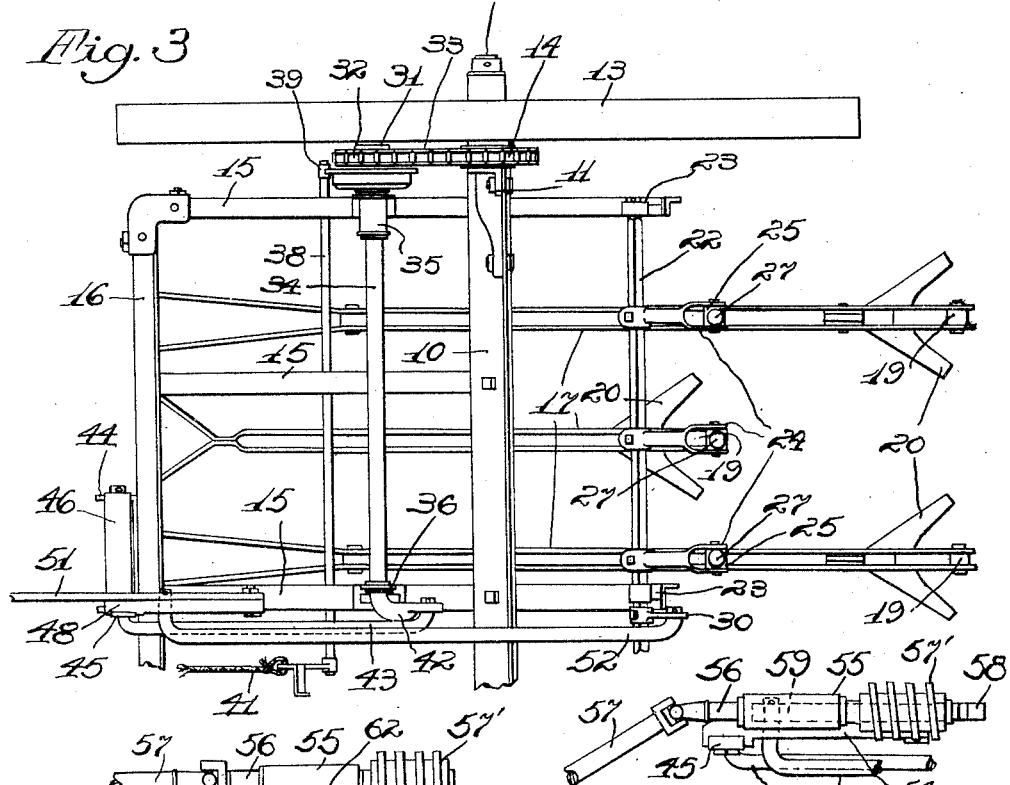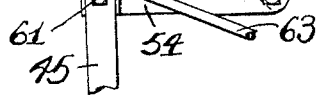

1,846,457

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

CULTIVATOR

Application filed September 17, 1930. Serial No. 482,519.

This invention relates to a field cultivator. More specifically it relates to a depth regulator and lift for such an implement.

The principal object of the invention is to provide an improved power operated lift.

Another object is to provide a constant height lift incorporated with which means are provided for regulating the working depth of the implement.

This and other objects, which will be apparent, are accomplished by the device as illustrated in the drawings and described in detail in the following manner.

Figure 1 is a sectional view showing the working mechanism of the device in elevation;

Figure 2 is a detail view of a portion of the lift mechanism showing in dotted lines an adjusted position of the depth regulating mechanism;

Figure 3 is a fragmentary plan view; and,

Figures 4 and 5 are enlarged detail views of a modified depth regulating adjustment.

The cultivator shown in the drawings is mounted on a frame structure composed of a plurality of angle bars rigidly secured together. The angle bar 10 extends lengthwise of the frame structure. At each end of the bar 10, a bracket 11 having a stub-axle extension 12 integral therewith provides means for mounting the ground wheel 13. A chain sprocket 14 mounted for rotation with the wheel 13 provides means for driving the power lift. Angle bars 15 extending transversely of the bar 10 and a front angle bar 16 comprise the principal elements of the frame structure. A plurality of cultivator beams 17 are pivotally attached to the forward bar 16 by brackets 18. Shanks 19 secured to the cultivator beams by spring trip devices of a conventional nature provide means for attaching the cultivator shovels 20. A rockshaft 22 extends transversely of the frame structure and is mounted thereabove on brackets 23, which are attached to the crossbars 15 and extend upwardly therefrom. A series of lever arms 24 are attached to the rockshaft 22. Each of the lever arms 24 is substantially in alignment with one of the cultivator beams 17. A block 25 is pivoted at the end of the arms 24. A rod 26 having a stop 27 at the upper end thereof extends slidably through an opening in the block 25 and is pivotally connected to the cultivator beam below the lever arm. A stop 28 is provided on the rod 26 against which a compression spring 29 abuts. The spring operates to push yieldingly downward against the cultivator beam. An actuating lever 30 is also attached to the rockshaft 22 and is operated as will be hereinafter described. A power lift clutch mechanism 31 is mounted on the frame structure for operating the rockshaft 22. The clutch mechanism is essentially like those of the prior art in which intermittent half revolutions are transmitted from a constantly rotated member to an intermittently rotated member. The continuously rotated member is rockable with a chain sprocket 32, which is driven by a chain 33 extending over the sprocket 14. A shaft 34 mounted in bearing brackets 35 and 36, secured to the cross-members 15, is secured to the portion of the clutch adapted to be intermittently rotated half revolutions.

As best shown in Figure 2, a crank 37 at the end of a shaft 38 mounted on the frame structure is provided with a roller 39, which engages the notches 40 on the clutch mechanism 31. The shaft 38 is also provided with a crank at its other end, to which a tension element, such as a rope 41, may be attached for actuating the clutch mechanism. The action of the clutch used in this device is exactly like those of the prior art. When the crank 37 is rotated so that the roller 39 is withdrawn from the notch 40, the clutch engages and rotates the shaft 34 a half revolution.

The shaft 34 is provided at the end opposite the clutch mechanism with a crank 42. A link 43, pivotally mounted at the end of the crank 42, extends forwardly upwardly where it engages another portion of the lifting mechanism, which will be described in detail. A bracket 44 attached to the forward side of the front frame bar 16 has forward extensions which provide means for mounting a bar 45 in a vertical position and pivoted on a transverse axis. A bar 46 secured to the bar 45 by bolts 47 extends laterally outward to one of the spaced extensions on the member 44, thereby forming a brace for said bar. A plate-like member 48 attached to the top of the bar 45 extends rearwardly therefrom. The member 48 is provided with an arcuate slot 49 of a particular construction for a purpose which will be hereinafter described. The member 48 also carries a notched quadrant 50. A hand adjusting lever 51 is pivotally mounted on the member 48 at the center of the quadrant 50. A latch mechanism of a conventional nature, not shown, is provided on the lever 51 for locking said lever in position at different locations along the quadrant 50.

A link 52 having a bent portion, which pivotally engages the actuating lever 30 on the rockshaft, is also provided with a bent portion at the other end which passes through the slot 49 and through a slot 53 in the lever 51. The link 52 is held in operative position by pins in its ends.

It will be understood by inspection of the drawings that angular movement of the lever 51 will oscillate the rockshaft 22, thereby raising and lowering the position of the cultivator beams and the shovels carried thereby. It will also be evident that by operation of the power lift clutch the upstanding bar 45, on which the member 49 is mounted, will be oscillated due to the action of the crank 42 transmitted through the link 43 to said bar.

One of the principal objects of the invention is to provide a device giving a constant height lift regardless of the set of depth at which the cultivator shovels operate in the slot. This object is accomplished by the particular positioning of the slot 49. The slot 49 is a portion of an arc described with the pivot point of the link 52 on the actuating lever 30 as a center when said elements are in lifted position, as shown in dotted lines in Figure 1. It will be understood that by this particular construction of the slot 49 the adjustment of the lever 51 with respect to the quadrant 50 does not influence the height to which the cultivator beams 17 are raised. When the power lift mechanism is again operated and the cultivator beams are lowered in position, the depth regulating means is effective, as the slot 49 is then no longer concentric with respect to the pivot point of the link 52 on the lever 30. It will be noted that a slot 53 is provided in the lever 51 to allow for the eccentricity of the slot 49 with respect to the arc of action described by the movement of the lever 51 about its pivot point on the member 48.

Figures 4 and 5 show a modified mechanism for operating the depth regulating means. The member 54, which corresponds to the member 48 in the device previously described, is provided with an integral support 55 for a shaft 56 adapted to be rotated by means of a shaft 57 extending, for example, to the operator's seat on a tractor to which the implement may be attached. The shaft 56 is provided with an integral worm 57' which engages a sector 58 pivotally mounted on the member 54. The sector 58 has a radial extension 59 which contains a slot 60 in substantial alignment with a slot 61 in the member 54. A link 62, corresponding to the link 52 in the device previously described, has a bent end extending through the slots 60 and 61. It will be understood that by the operation of the worm 57' the sector 58 is rotated with respect to the member 54, whereby the end of the link 62 may be reciprocated in the slot 61. This adjustment functions exactly the same as the means previously described for adjusting the depth at which the cultivator shovels operate. The power lift mechanism operates in the modified form through the link 63 in the same manner as in the device previously described.

It is to be understood that applicant has shown only a preferred embodiment of his device and that he claims as his invention all modifications thereof falling within the scope of the appended claims.

What is claimed as new is:

1. In an implement having a wheel supported frame structure and soil working tools connected thereto, a constant height lifting means comprising an upstanding support mounted on the frame structure and pivoted thereto for swinging on a transverse axis, means for swinging said support, means mounted on the frame structure for lifting and lowering the soil working tools, an actuating lever attached to said means, a member rigidly attached to the forward support, an actuating link pivotally attached to the actuating lever and adjustably pivoted on said member in such a manner that the pivot points lie on an arc having a center coincident with the pivot point of the link on the actuating lever in one extreme position of the support, whereby when the support is in that position the actuating link may be adjusted with the lifting means remaining stationary and whereby the limit of movement of the actuating means in the other direction may be varied.

2. In an implement having a wheel supported frame structure and a soil working tool connected thereto, a constant height lifting device operatively connected to said tool comprising an upstanding support mounted forwardly on the frame structure and pivoted thereto for swinging on a transverse axis, means for swinging said support, means mounted at the rear of said frame structure for lifting and lowering the soil working tool, an actuating lever attached to said means, a member rigidly attached to the forward support, an arcuate slot in said member, an actuating link pivotally attached to the actuating lever and having an end portion slidable in said slot, said slot having a center coincident with the pivot point of the link on the actuating lever in one extreme position of the support, whereby when the support is in one extreme position the actuating link may be adjusted in the slot without affecting the movement of the lifting means in that direction and whereby the limit of movement of the actuating means in the other direction may be varied.

3. A field cultivator comprising a wheel supported frame structure, implement beams attached thereto and extending rearwardly therefrom, a rockshaft mounted at the rear of the structure, lever arms extending from said shaft, links pivotally connecting said arms and said beams, an actuating lever connected to said shaft, lifting and depth adjusting means mounted on the frame structure comprising an upstanding support pivoted on the frame structure on a transverse axis, means for rocking said support, a member rigidly secured to said support and provided with an arcuate slot, a depth adjusting lever pivoted to said member and adjustable with respect thereto, a link pivotally connected to the actuating lever on the rockshaft and having an end portion extending through the slot in said member and pivotally attached to the actuating lever, said slot having a center coincident with the pivot point of the link on the actuating lever when the implement beams are in the lifted position, whereby the depth adjusting lever may be operated without altering the height to which the cultivating beams are lifted.

In testimony whereof I affix my signature.

CHARLES W. ROBINSON.